March 22, 1932.     C. M. NORRIS     1,850,469
EXPOSURE SIGNAL FOR CAMERA SHUTTERS
Filed March 17, 1930
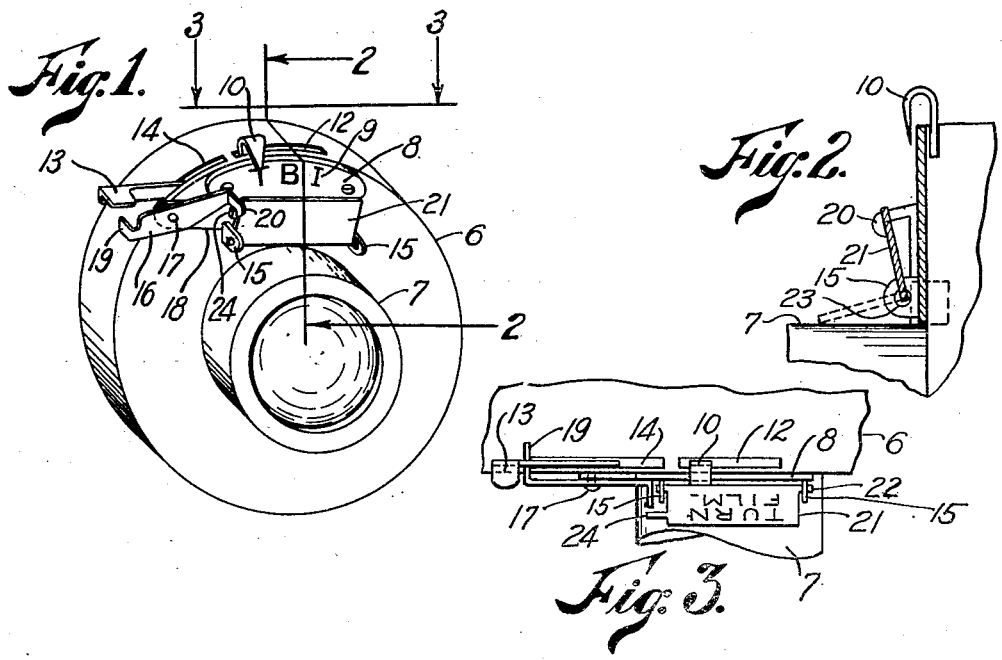
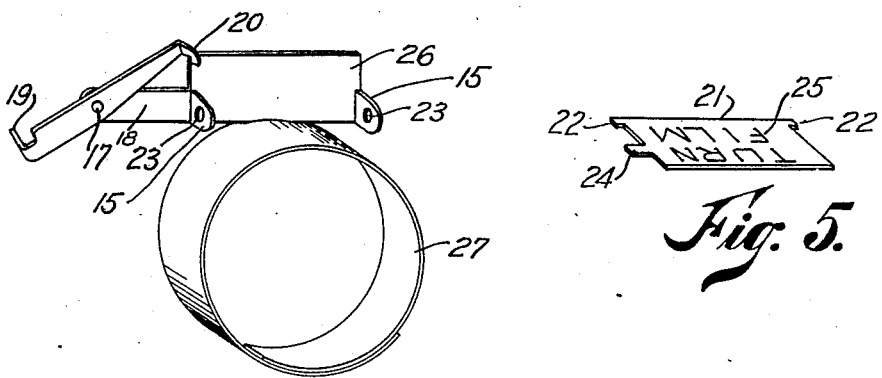
INVENTOR.
CHARLES M. NORRIS.
BY Rollander & Stratton
ATTORNEYS.

Patented Mar. 22, 1932

1,850,469

UNITED STATES PATENT OFFICE

CHARLES M. NORRIS, OF HOLLY, COLORADO

EXPOSURE SIGNAL FOR CAMERA SHUTTERS

Application filed March 17, 1930. Serial No. 436,378.

My invention relates to an exposure signal for camera shutters. The principal object of the invention is to provide a reminder for the user, so that two photographs will not be taken on the same section of film or the same plate. The invention may be used on a camera using a roll film, a pack of films, or plates.

An object of the invention is to provide mechanism for such a reminder that will be actuated every time a photograph is taken.

Another object is not only to provide such an attachment that may be placed on the camera at the factory, but also to provide one that may be quickly and easily placed on any camera by the user.

Other objects reside in providing simple and practical means for producing the foregoing results. Novel details of construction and novel combinations and arrangements of parts will appear in the course of the following description.

In the drawings, like reference characters in the several views designate similar parts.

Figure 1 is a perspective view of a part of a camera, to which mechanism embodying the present invention has been applied.

Figure 2 is a section taken on the line 2—2 of Figure 1.

Figure 3 is a plan view taken on the line 3—3 of Figure 1, after actuation of the device.

Figure 4 is a perspective view of a modified construction embodying the present invention.

Figure 5 is a perspective view of a signal plate comprised in the invention.

Referring more in detail to the drawings, a housing for shutter operating mechanism is shown at 6. A lens tube 7 is mounted on the housing 6. Fastened to the housing is an indicating plate 8 carrying indicia 9. A pointer 10 projecting through a slot 12 in the housing is connected with the shutter operating mechanism (not shown) and cooperates with the indicia 9. A trigger 13 projecting through another slot 14 in the housing 6 actuates the shutter mechanism. Since the mechanism in the housing per se forms no part of the present invention, illustration and further description of same appears unnecessary.

The plate 8 is extended to the lens tube 7, as best shown in Figure 2, and carries apertured tabs 15. A latch lever 16 is fulcrumed at 17 on a projection 18 of the plate 8. One end of the latch 16 has a flange 19 disposed in the path of the trigger 13, so that movement of the trigger will operate the latch. The opposite end of the latch has a hooked finger 20. The latch is pivoted at a point whereby the center of gravity is between the fulcrum 17 and the end carrying the finger or hook 20.

A signal plate 21 has oppositely disposed lugs 22 trunnioned in apertures 23 of the tabs 15. A tongue 24 also on the signal plate is arranged to cooperate with the latch. The signal plate may carry any suitable legend 25, such as "Turn film", and the like, to remind the user to turn the film, tear out a sheet (if the camera uses a pack), and the like.

In the form shown in Figure 4, a plate 26 carries an integral, overlapping spring 27 adapted to be clamped around various sizes of lens tubes for photograph cameras. The modification shown in Figure 4 is otherwise similar to the form described above.

In the operation and use of the invention, the signal plate 21 is lifted to a position in which the latch engages the tongue 24. The signal plate is thereby held out of a vertical position by gravity. When the trigger 13 is moved by depression, by squeezing a bulb, or otherwise, the latch 16 is thereby moved, so that the signal plate is released and allowed to fall by gravity to the dotted line position shown in Figure 2, where it rests on the lens tube.

In this last position of the signal plate, the legend 25, which it carries, is visible to the operator, which reminds him to adjust the film. Thereafter the signal plate is raised to its former position, and the attachment is ready for the next operation. The signal, therefore, drops simultaneously with, or shortly after, the operation of the shutter.

It seems clear that the spring 27 may be clamped around a variety of sizes of lens tubes and that the width of the spring will hold the attachment against turning in a horizontal plane.

What I claim and desire to secure by Letters Patent is:

1. The combination with a camera shutter and a shutter-operating trigger thereof, of a pivoted signal plate, and a signal plate latch provided with means to engage and hold the plate in a certain inoperative position and extending in the path of the trigger and adapted to be engaged by and movable with the same to release the plate when the trigger is operated without interfering with the movement of the trigger.

2. The combination with a camera shutter and a shutter-operating trigger thereof, of a pivoted signal plate, a signal plate latch provided with means to engage and hold the plate in a certain inoperative position and extending in the path of the trigger and adapted to be engaged by and movable with the same to release the plate when the trigger is operated without interfering with the movement of the trigger, both the latch and the plate being mounted to move by gravity.

3. The combination with a camera shutter having a lens tube and a shutter operating trigger, of a pivoted signal plate adapted to fall by gravity to a position in which it is supported by the lens-tube, and a signal plate latch provided with means to engage and hold the plate in a raised position, extending in the path of the trigger and adapted to be engaged by and movable with the same to release the plate when the trigger is operated without interfering with the movement of the trigger.

4. A camera shutter attachment including an upright supporting plate having spaced end bearings and provided at the bottom with a lens tube engaging clamp, said supporting plate being provided with an extension, a signal plate pivotally mounted in the said bearings, and a latch pivotally mounted on the extension of the supporting plate and provided at one end with means for engaging the signal plate to hold the same in a raised position, said latch being provided at its other end with means arranged to extend into the path of a shutter operating trigger and adapted to be actuated by the same without interfering with the movement of the trigger to release the signal plate and cause the same to fall by gravity to an indicating position.

5. A camera shutter attachment including a signal plate, means for pivotally mounting the same on a camera shutter to swing upwardly and downwardly, and latch mechanism for holding the signal plate in an elevated position, said latch mechanism being provided with means extending into the path of a shutter operating trigger, and arranged to be actuated by the said trigger without interfering with the movement thereof to release the said signal plate and cause the same to fall by gravity to an indicating position.

In testimony whereof I hereunto affix my signature.

CHARLES M. NORRIS.